(12) United States Patent
Hecker et al.

(10) Patent No.: US 7,823,502 B2
(45) Date of Patent: Nov. 2, 2010

(54) WIRELESS ROTISSERIE

(75) Inventors: Steven L. Hecker, Santa Monica, CA (US); James Bears, Boynton Beach, FL (US)

(73) Assignee: Thermotisserie, LLC, Los Angeles, CA (US)

( * ) Notice: Subject to any disclaimer, the term of this patent is extended or adjusted under 35 U.S.C. 154(b) by 796 days.

(21) Appl. No.: 11/554,620

(22) Filed: Oct. 31, 2006

(65) Prior Publication Data
US 2008/0098903 A1    May 1, 2008

(51) Int. Cl.
*A47J 37/04* (2006.01)

(52) U.S. Cl. .................. 99/421 M; 99/421 H; 99/421 R

(58) Field of Classification Search .... 99/419 V–421 V, 99/339, 340, 348, 352–355, 444–450, 326–333, 99/481, 482, 421 M, 421 H, 421 HH, 421 HV, 99/421 P, 421 TP, 415, 418, 347, 345; 126/25 R, 126/9 R, 21 R; 219/449.1, 400, 401; 361/701, 361/688, 689, 695, 699; 165/104.33
See application file for complete search history.

(56) References Cited

U.S. PATENT DOCUMENTS

| | | | |
|---|---|---|---|
| 1,789,300 A * | 1/1931 | Bihl et al. ............... | 221/150 R |
| 3,257,936 A | 6/1966 | Holka et al. | |
| 3,590,725 A | 7/1971 | Bilynsky | |
| 5,086,693 A | 2/1992 | Tippmann et al. | |
| 5,376,184 A | 12/1994 | Aspden | |
| 5,429,547 A | 7/1995 | Bichelmeyer | |
| 5,501,142 A * | 3/1996 | Bailey ......................... | 99/482 |
| 5,515,774 A | 5/1996 | Swisher et al. | |
| 5,562,022 A | 10/1996 | Schmid et al. | |
| 5,649,500 A | 7/1997 | Klavemann et al. | |
| 5,726,380 A | 3/1998 | Ozutsumi et al. | |
| 5,782,168 A | 7/1998 | Krhnak | |
| 5,801,357 A * | 9/1998 | Danen ........................ | 219/403 |
| 5,832,811 A | 11/1998 | King | |
| 5,918,534 A | 7/1999 | Medina | |
| 6,166,608 A | 12/2000 | Merriss et al. | |
| 6,257,227 B1 | 7/2001 | Harbin | |
| 6,279,464 B1 | 8/2001 | Lo et al. | |
| 6,837,150 B2 | 1/2005 | Backus et al. | |
| 6,855,880 B2 | 2/2005 | Feher | |
| 6,874,408 B2 | 4/2005 | Backus et al. | |
| 7,021,204 B2 | 4/2006 | Backus et al. | |
| 7,168,363 B1 * | 1/2007 | Brown ..................... | 99/421 M |
| 7,325,484 B1 * | 2/2008 | Backus et al. ............. | 99/421 H |
| 7,478,586 B2 * | 1/2009 | Gabrielle ..................... | 99/340 |
| 2007/0210063 A1 * | 9/2007 | Conrad .................... | 219/449.1 |
| 2009/0020109 A1 * | 1/2009 | Rheault .................... | 126/25 R |

* cited by examiner

*Primary Examiner*—Reginald L Alexander
(74) *Attorney, Agent, or Firm*—Gifford, Krass, Sprinkle, Anderson & Citkowski, P.C.

(57) ABSTRACT

A rotisserie cooking device for use in an oven includes a food holding member. At least one motor is operatively linked with the food holding member. At least one thermopile is associated with the motor. The at least one thermopile provides energy for driving the at least one motor for rotating the food holding member.

18 Claims, 3 Drawing Sheets

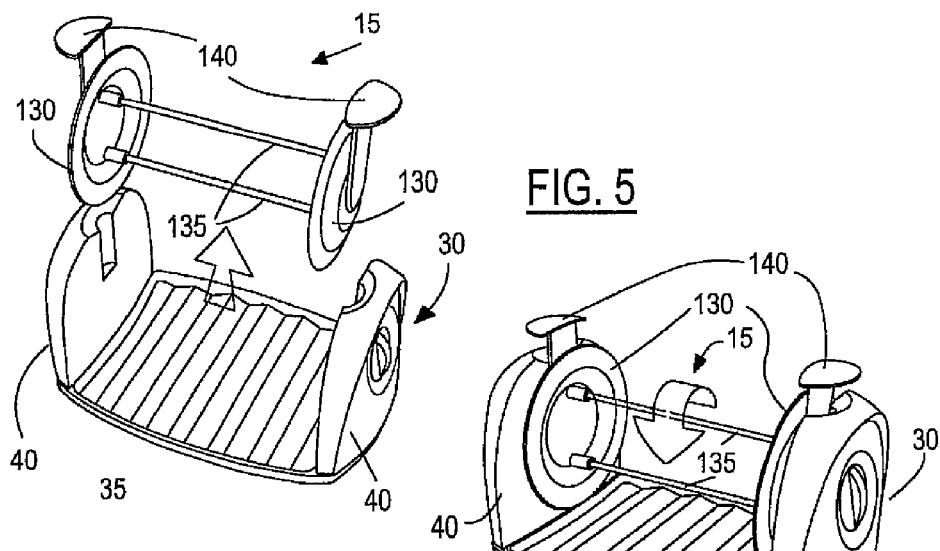
FIG. 5
FIG. 6
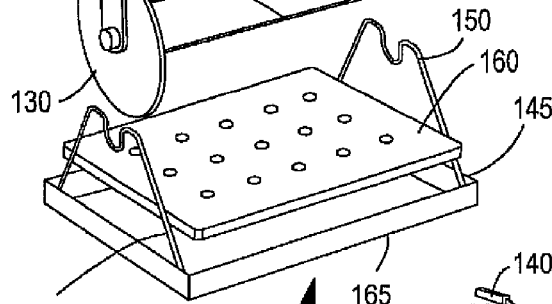
FIG. 7
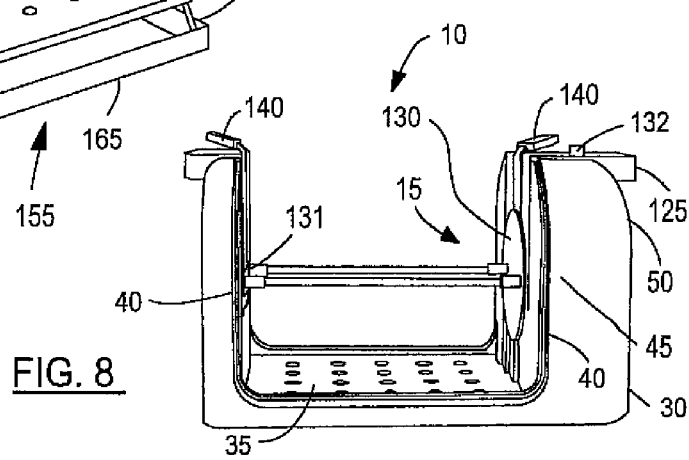
FIG. 8

WIRELESS ROTISSERIE

FIELD OF THE INVENTION

The invention relates to rotisserie cooling devices and with more particularity to wireless rotisserie cooking devices.

BACKGROUND OF THE INVENTION

Rotisserie cooking devices are known in the art. A rotisserie is generally known as a device that cooks food by rotating it slowly past a heating element or heat source in either a vertical or horizontal orientation. Rotisserie cooking is gaining acceptance as an improved way of cooking a large food item such as a piece of meat or poultry. Benefits of cooking using a rotisserie includes slow and even roasting and self-basting resulting in an improved food item.

Prior art rotisseries may be in the form of a countertop device that draws electrical power to provide both for rotation as well for generating heat within the device. Such countertop versions of rotisseries take up a large amount of counter space and may create a burn hazard as the entire product gets extremely hot when cooking. Additionally such countertop models do not allow for cooking other food items simultaneously within the rotisserie oven. Also, such known countertop rotisserie ovens may produce motor noise and noise caused by rotational friction of the parts moving within the oven.

Other examples of rotisseries include accessory type devices that are positioned in a grill or oven or other type of cooking source. Typically these devices require an electrical power source such as a coupling or cord that links with an electrical power source.

The aforementioned rotisserie devices are limited in that they require a separate source of electrical power for rotating the rotisserie and in some cases for generating the thermal energy for cooking. There is therefore a need in the art for a rotisserie cooking device that converts the thermal energy of an oven or other cooking appliance to mechanical energy for rotating the rotisserie. There is also a need in the art for a rotisserie cooking device that is positioned within an oven or other cooking source insulating against unwanted noise. Further, there is a need in the art for a rotisserie cooking device that is easy to store and does not take up counter space.

SUMMARY OF THE INVENTION

A rotisserie cooking device for use in an oven includes a food holding member. At least one motor is operatively linked with the food holding member. At least one thermopile is associated with the motor. The at least one thermopile provides energy for driving the at least one motor for rotating the food holding member.

BRIEF DESCRIPTION OF THE DRAWINGS

FIG. 4 is an exploded perspective view detailing the thermopile and heat sink of a rotisserie cooking device;

FIG. 5 is a perspective view of an embodiment of a rotisserie cooking device with the food holding member positioned above a housing of the rotisserie cooking device wherein the food holding member includes handles positioned thereon;

FIG. 6 is a perspective view of the embodiment of FIG. 5 with the food holding member positioned within the housing such that the motor is operatively linked with the food holding member;

FIG. 7 is a perspective view of a stand for supporting the food holding member when it is removed from the housing;

FIG. 8 is a front view of a rotisserie cooking device.

DETAILED DESCRIPTION OF THE PREFERRED EMBODIMENTS

Figure 1:
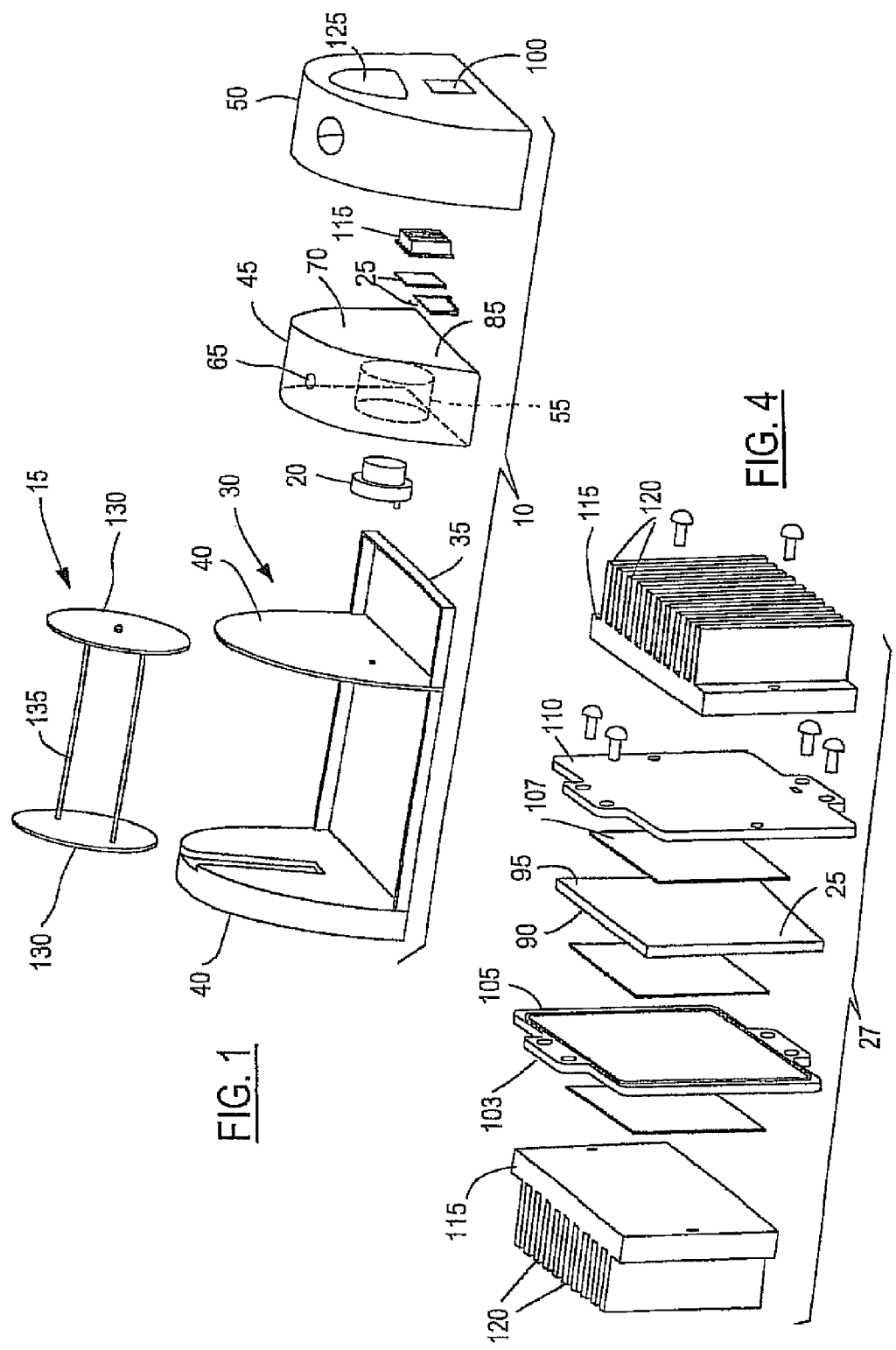
FIG. 1 is a perspective assembly view of a rotisserie cooking device.

Referring to FIGS. 1, 2, 3, and 8 there are shown embodiments of a rotisserie cooking device 10. The rotisserie cooking device 10 includes a food holding member 15 and a motor 20 that is operably linked with the food holding member 15. At least one thermopile 25 is associated with the motor 20 and provides energy for driving the motor 20 to rotate the food holding member 15.

The rotisserie cooking device 5 includes a housing 30 having a base 35 and opposing end portions 40. The food holding member 15 is rotatively disposed between the opposing end portions 40 when it is driven by the motor 20.

Figure 2:
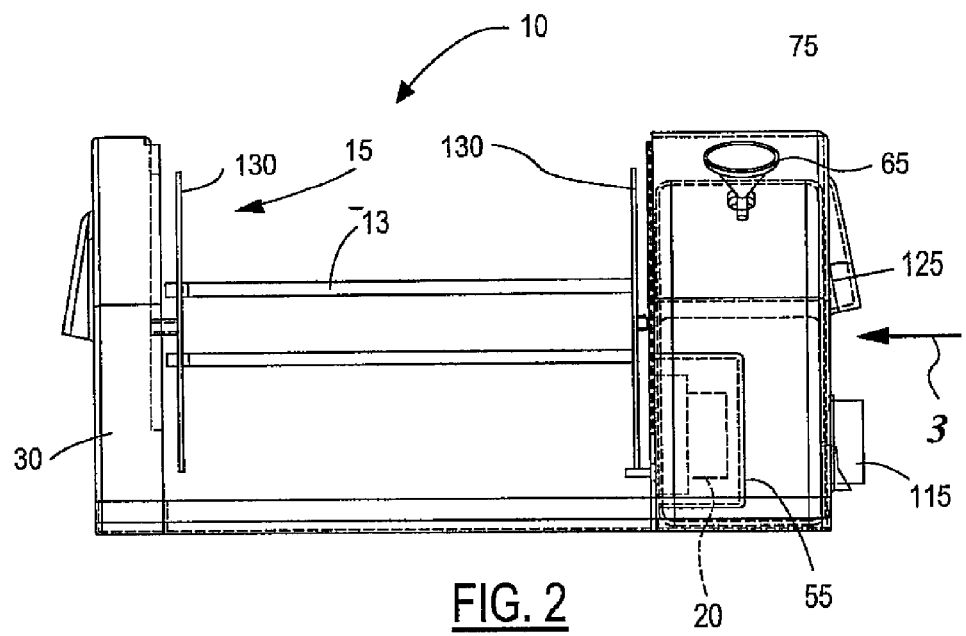
FIG. 2 is a front view of a rotisserie cooking device.
Figure 3:
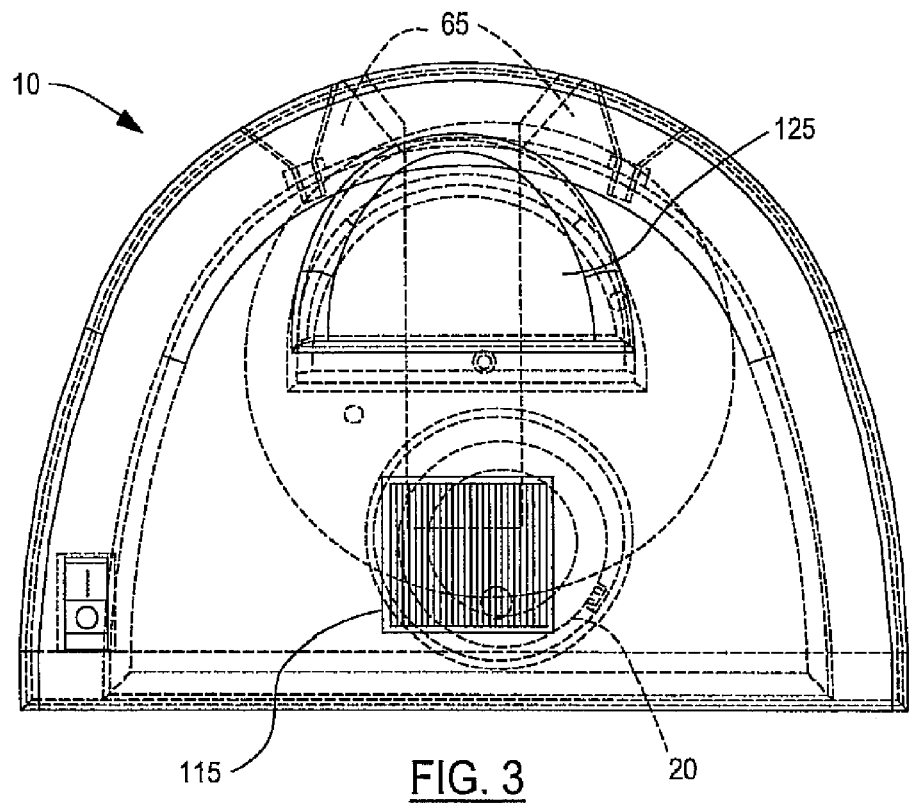
FIG. 3 is a side view of a rotisserie cooking device.

At least one of the end portions 40 includes a liquid reservoir 45 that is attached thereto. While only one liquid reservoir 45 is shown in FIGS. 1, 2 and 3, it should be realized that multiple liquid reservoirs 45 may be utilized. A cover 50 that is thermally insulating is positioned about the liquid reservoir 45 and insulates the liquid reservoir 45. In one aspect, the liquid reservoir 45 includes a cavity 55 formed therein that receives the motor 20. The liquid reservoir 45 provides thermal protection to the motor by wrapping around the motor 20. In this manner, the motor 20 temperature is regulated by the liquid contained in the liquid reservoir 45.

In one aspect, the liquid reservoir 45 may be constructed of a material that has a low coefficient of thermal conductivity. The liquid reservoir 45 may be formed of one piece or have multiple pieces that are assembled together. Additionally, the liquid reservoir 45 includes at least one opening 65 formed therein for allowing ingress and egress from an interior 70 of the liquid reservoir 45. As best shown in FIG. 3, multiple openings 65 with two shown in the figure may be utilized. In one aspect of the invention, vent members 75, as best seen in FIG. 2, may be disposed about the at least one opening 65 formed in the liquid reservoir 45 to aid in the introduction of liquid into the reservoir, as well as to limit the evaporation of liquid from the reservoir at an elevated temperature.

The liquid reservoir 45 also includes a region for the transfer of heat positioned in a lower portion 85 of the liquid reservoir 45. The region may include a hole or may be solid for providing access to a cooling source for the cold surface 90 of the thermopile 25, which will be described in more detail below. In one aspect, the region of the liquid reservoir 45 is positioned at the lowest possible elevation so as to be positioned relative to the liquid contained in the reservoir for as long as possible as the liquid will evaporate at an elevated temperature.

As stated above, at least one thermopile 25 is associated with the motor 20 to provide an energy source for driving the motor 20 and rotating the food holding member 15. The thermopile 25 includes a cool side 90 that is positioned at the heat transfer region of the liquid reservoir 45 and a hot side 95 that is exposed to an elevated temperature contained in an oven. In this manner, a temperature gradient is formed across the thermopile 25 for providing a power source for the motor 20. Additionally, as described above the cover 50 positioned about the liquid reservoir 45 includes an opening 100 formed therein that allows the thermopile 25 to be in thermal contact at the cool side 90 with the liquid reservoir 45 and the hot side 95 is positioned within the opening 100 in the cover 50 for exposure to the exterior environment.

A thermopile 25 is generally a thin two-sided solid state device that creates a flow of electricity if there is a temperature differential from one side to the other. Any suitable thermopile 25 may be used in the rotisserie cooking device 10. Additionally, various numbers of thermopiles 25 may be used. For example, two or more thermopiles 25 may be associated with the motor 20.

Referring to FIG. 4, there is shown one embodiment of a thermopile assembly 27. The thermopile assembly 27 may include an inside bracket 103 that is positioned proximate the heat transfer region 85 of the liquid reservoir 45. A heat exchanger 115 is associated with the inside bracket 103 on the interior of the liquid reservoir 45. The heat exchanger 115 may be directly attached to the inside bracket 103 if a hole is present or the heat exchanger 115 may be attached to the region 85 of the liquid reservoir for heat exchange. The heat exchanger increases the surface area for heat transfer and aids in forming a temperature gradient in the thermopile 25.

The thermopile 25 may bonded with any suitable material 107 to an outside bracket 110 that is coupled with the inside bracket 103. In one aspect, the thermopile 25 may be bonded using a thermal epoxy or other bonding mixture that can withstand elevated temperatures and is resistant to differential shear forces applied over repeated heating and cooling cycles. The outside bracket 110 also includes a heat sink or heat exchanger 115 attached thereto for transferring heat from the exterior environment. The fins 120 of the heat exchanger 115 are oriented to make the most use of the natural heat convection flow in the exterior environment. The fins 120 may also be protected or located in an area so as to minimize exposure to cooking grime. Additionally, the heat exchanger 115 may be shaded from radiant energy from above, such as would be found during a broil setting of an oven where the top cooling element is in a fully energized state. The radiation shield may be a physical obstruction 125 on the housing 30 that allows the heat exchanger 115 to be located in the shadow of the obstruction 125. Additionally, a radiation shield may be positioned below the heat exchanger 115, as well to prevent direct exposure to a bottom preheating element.

Referring to FIGS. 5 and 6, there is shown one embodiment of a rotisserie cooking device 10 that includes a housing 30 such that the opposing sides 40 are pivotally coupled to the base 35 for collapsing the sides 40 relative to the base 35. In this manner, the rotisserie cooking device 10 may be folded down when not in use for easy storage. Additionally, the food holding member 15 in the depicted embodiment includes opposing end plates 130 and at least one skewer 135, with two shown, that are removably connected to the end plates 130. In this manner a food item may be easily placed on the skewers 135 and removed by a user. In another aspect, the food holding member 15 may include thermally nonconductive handles 140 that are attached thereto. This allows a user to remove the food holding member 15 from the housing 30 without the use of insulated oven mitts or other such devices.

Referring to FIG. 7, there is shown a stand 145 for supporting the food holding member 15 when it is removed from the housing 30. The stand 145 includes opposing side members 150 that are adapted to retain the opposing end plates 140 of the food holding member 15. The stand 145 also includes a base 155 that has a cutting portion 160 for cutting a food item. A drip tray 165 may be positioned below the cutting portion 160 to prevent juices or drippings from the food item draining over a countertop or other supporting structure.

Referring to FIG. 8, there is shown another embodiment of a rotisserie cooking device 10. The pictured embodiment includes a differently configured housing 30 and food holding member 15, but operates in the same manner. The food holding member 15 includes an end plate 130 and a bar 131. As with the previously described embodiment, the food holding member is rotatively disposed in the housing 30 and linked with the motor 20. The description above with respect to the liquid reservoir 45 and thermopile 25 are similar. The housing 30 may also include a liquid level indicator 132 that indicates when the level of liquid within the liquid reservoir 45 has dropped below a specified level.

In use, a user will position a liquid within the liquid reservoir 45. A preferred liquid for use includes water. A user may position a food item about the skewers 135 of the food holding member 15. Next a user will position the food holding member 15 within the housing 30 such that it is operatively linked with the motor 20. Various linkages may be used for connecting the food holding member 15 to the motor 20 such as a gear train or other such transmission. Next, the rotisserie cooking device 10 is positioned within an oven that is set at an elevated temperature. The heat exchanger 115 warms rapidly while the liquid in the liquid reservoir remains at a lower temperature. This initial condition provides a large temperature gradient. For example an oven may be at a temperature of 350 degrees F. while the liquid, such as water will be at 80 degrees F. for a gradient of 270 degrees. Eventually, the heat exchanger 115 passes enough heat from the oven to bring the liquid contained in the liquid reservoir 45 to a slow simmer. At such time, the oven may be at 350 degrees F. and the water at 212 degrees F. for a temperature gradient of 138 degrees F. The liquid is allowed to evaporate and while operating at atmospheric pressure will maintain the liquid at its boiling point temperature. As the liquid evaporates, the thermopile 25 experiences a temperature gradient between the boiling point of the liquid on the cool side 90 and the temperature of the gases of the oven on the hot side 95, power is produced that is used to drive the motor 20 and in turn rotate the food holding member 15.

The invention has been described in an illustrative manner. It is to be understood that the terminology which has been used is intended to be in the nature of words of description rather than limitation. Many modifications and variations of the invention are possible in light of the above teachings. Therefore, within the scope of the appended claims, the invention may be practiced other than as specifically described.

The invention claimed is:

1. A rotisserie cooking device for use within a heated space of a cooking appliance comprising:
    a food holding member;
    at least one motor operatively linked with the food holding member;
    at least one thermopile electrically connected with the motor, the at least one thermopile providing energy for driving the at least one motor for rotating the food holding member;
    a housing including a liquid reservoir, the thermopile including a first side in thermal contact with the liquid reservoir at an area of the housing having a high thermal conductivity, a remainder of the housing formed of a low thermal conductivity material insulating the liquid reservoir and the thermopile including a second side attached to a heat sink exchanging heat with air in the heated space.

2. The rotisserie cooking device of claim 1 wherein the housing includes a base and opposing end portions.

3. The rotisserie cooking device of claim 2 wherein the food holding member is rotatively disposed between the opposing end portions.

4. The rotisserie cooking device of claim 2 wherein at least one of the end portions includes the liquid reservoir attached thereto.

5. The rotisserie cooking device of claim 4 including a cover disposed about the liquid reservoir.

6. The rotisserie cooking device of claim 5 wherein the cover is thermally insulating.

7. The rotisserie cooking device of claim 6 wherein the cover includes an opening formed therein for receiving the at least one thermopile.

8. The rotisserie cooking device of claim 1 wherein the motor is in thermal contact with the liquid reservoir regulating a temperature of the motor.

9. The rotisserie cooking device of claim 4 wherein the reservoir includes at least one opening formed therein for allowing ingress and egress from an interior of the reservoir.

10. the rotisserie cooking device of claim 9 including vent members disposed about the at least one opening formed in the reservoir.

11. The rotisserie cooking device of claim 1 including a plurality of thermopiles.

12. The rotisserie cooking device of claim 2 wherein the opposing sides are pivotally coupled to the base for collapsing the sides relative to the base.

13. The rotisserie cooking device of claim 1 wherein the food holding member includes opposing ends and at least one skewer removably connected to the ends.

14. The rotisserie cooking device of claim 1 wherein the food holding member includes thermally nonconductive handles attached thereto.

15. The rotisserie cooking device of claim 1 including a stand for supporting the food holding member when it is removed from the housing.

16. The rotisserie cooking device of claim 15 wherein the stand includes opposing side members adapted to retain the opposing ends and a base having a cutting portion for cutting a food item.

17. A rotisserie cooking device for use within a heated space of a cooking appliance comprising:
- a food holding member;
- a liquid reservoir;
- a motor disposed in a cavity formed in the liquid reservoir, the motor operatively linked with the food holding member;
- at least one thermopile electrically connected with the motor, the at least one thermopile providing energy for driving the at least one motor for rotating the food holding member.

18. A rotisserie cooking device for use within a heated space of a cooking appliance comprising:
- a food holding member;
- a housing for supporting the food holding member;
- a liquid reservoir attached to the housing,
- a thermally insulating cover disposed about the liquid reservoir, the cover including an opening formed therein;
- a motor disposed in a cavity formed in the liquid reservoir, the motor operatively linked with the food holding member;
- at least one thermopile electrically connected with the motor, the at least one thermopile in thermal contact with the liquid reservoir on one side of the thermopile and positioned within the opening in the cover on a second side for creating a thermal gradient generating energy for driving the motor for rotating the food holding member.

* * * * *